US009143340B2

(12) United States Patent
Von Tetzchner

(10) Patent No.: US 9,143,340 B2
(45) Date of Patent: Sep. 22, 2015

(54) METHOD OF PROVIDING COMMUNICATION BETWEEN DEVICES

(75) Inventor: Jon S. Von Tetzchner, Oslo (NO)

(73) Assignee: OPERA SOFTWARE ASA, Olso (NO)

( * ) Notice: Subject to any disclaimer, the term of this patent is extended or adjusted under 35 U.S.C. 154(b) by 866 days.

(21) Appl. No.: 13/340,138

(22) Filed: Dec. 29, 2011

(65) Prior Publication Data

US 2012/0173627 A1 Jul. 5, 2012

Related U.S. Application Data

(60) Provisional application No. 61/428,249, filed on Dec. 30, 2010.

(51) Int. Cl.
| | |
|---|---|
| G06F 15/16 | (2006.01) |
| H04L 12/28 | (2006.01) |
| G06F 21/10 | (2013.01) |
| H04W 4/20 | (2009.01) |
| H04W 4/00 | (2009.01) |

(52) U.S. Cl.
CPC ............ H04L 12/2809 (2013.01); G06F 21/10 (2013.01); H04L 12/2814 (2013.01); H04W 4/003 (2013.01); H04W 4/20 (2013.01)

(58) Field of Classification Search
CPC ......... H04W 4/003; H04W 4/20; G06F 21/10
USPC ......................................................... 709/204
See application file for complete search history.

(56) References Cited

U.S. PATENT DOCUMENTS

| | | | |
|---|---|---|---|
| 2011/0270807 A1* | 11/2011 | Maturana et al. | 707/690 |
| 2012/0109902 A1* | 5/2012 | Rozensztejn et al. | 707/689 |
| 2012/0110317 A1* | 5/2012 | Scheer et al. | 713/150 |

* cited by examiner

Primary Examiner — Richard G Keehn
(74) Attorney, Agent, or Firm — Birch, Stewart, Kolasch & Birch, LLP

(57) ABSTRACT

The present invention relates to a method of providing communication between a first device and a second device, wherein the second device has a server component, the method comprising: establishing initial communication between the devices, wherein at least one of the devices receives from the other device data including at least one of a) a description or identification of the other device and b) a description or identification of a service; and providing instructions to the second device based at least on the received data, wherein the instructions and the server component allow the second device to respond to a subsequent request from the first device.

The present invention also relates a system comprising electronic devices capable of communicating with each other.

9 Claims, 1 Drawing Sheet

METHOD OF PROVIDING COMMUNICATION BETWEEN DEVICES

CROSS REFERENCE TO RELATED APPLICATION

This nonprovisional application claims the benefit of U.S. Provisional Application No. 61/428,249 filed on Dec. 30, 2010, the entire contents of which are hereby incorporated by reference.

TECHNICAL FIELD OF THE INVENTION

The present invention relates to a method of providing communication between devices. The present invention also relates to a system comprising electronic devices capable of communicating with each other.

BACKGROUND OF THE INVENTION

Devices such as home appliances, entertainment system components, remote controls, home automation systems, alarm systems etc. currently exchange commands and information (if at all) using embedded software and proprietary protocols. Remote controls are designed to operate with their designated devices, automation and alarm systems have separate control units or dedicated applications installed on generic computers, and updates or improvements in the form of software upgrades are rarely possible. Attempts to go beyond this rigid situation include universal remote controls that implement a plethora of proprietary protocols in order to be able to control a wide range of products, and certain devices that implement standards based solutions to transfer data or present a user interface (TCP/IP, UDP, HTTP, HTML, WiFi, Bluetooth).

Exceptions to this situation exist within the world of data communication, where devices typically are programmable, and where solutions solving issues related to discovery and configuration do exist (UPnP, Bonjour).

Nevertheless, problems exist with prior art solutions. For instance, devices that were not specifically designed to interact cannot interact, even if they provide complementary functionality. Also, new devices do not discover old devices and cannot communicate with them or control them (or vice versa). Also, devices cannot be reprogrammed to deliver new functionality. Also, generic devices cannot be used to control a number of other devices. Instead, each device has its own user interface and/or remote control.

SUMMARY OF THE INVENTION

The present invention is defined in the appended independent claims. Embodiments are set forth in the appended dependent claims.

According to an aspect of the invention, there is provided a method of providing communication between a first device and a second device, wherein the second device has a server component, the method comprising: establishing initial communication between the devices, wherein at least one of the devices receives from the other device data including at least one of a) a description or identification of the other device, and b) a description or identification of a service; and providing instructions to the second device based at least on the received data, wherein the instructions and the server component allow the second device to respond to a subsequent request from the first device.

The method may further comprise: the first device sending a request to the second device; and the second device responding to the request using the instructions and the server component.

The first device may have a user agent for communicating with the second device. The user agent may be a web browser.

Said server component may be provided by a user agent on the second device, which user agent is configured to act as a web server.

Said request and a response to the request may be messages in a standardized format and sent using a standard network protocol.

Said instructions may be provided based on b) the description or identification of a service, wherein said request and a response to the request are related to said service.

Said instructions may be at least one of software, configuration settings, a service providing software module, a computer-interpretable script, and a web or server widget.

Said instructions may automatically be provided to the second device following the initial communication.

The second device may form part of a network also including several other devices, wherein the first device is newly connected to the network.

The initial communication may include the first device receiving the data from the second device, wherein providing instructions to the second device includes at least one of: the first device having the instructions pre-stored in a memory of the first device and sending the instructions to the second device; the first device downloading the instructions from an external unit and forwarding the downloaded instructions to the second device; and the first device sending an address of an external unit to the second device, and the second device downloading the instructions from the external unit based on the address received from the first device.

The initial communication may include the second device receiving the data from the first device, and wherein providing instructions to the second device includes the second device automatically downloading the instructions based on the data received from the first device.

According to another aspect of the invention, there is provided a system comprising: at least one first electronic device having a web browser component; and at least one second electronic device having a web server component, wherein the first device is configured to send a service request to the second device using the web browser component, and wherein the second device is configured to respond to the service request using web server component and a service providing software module, which service providing software module is installed on the second device and received from the outside based on a preceding mutual or one-sided exchange of credentials between the first and second device. This aspect of the invention may exhibit the same or similar technical effects and features as the previously described aspect.

BRIEF DESCRIPTION OF THE DRAWING

These and other aspects of the present invention will now be described in more detail, with reference to the appended drawings showing currently preferred embodiments of the invention.

DETAILED DESCRIPTION

Figure 1:
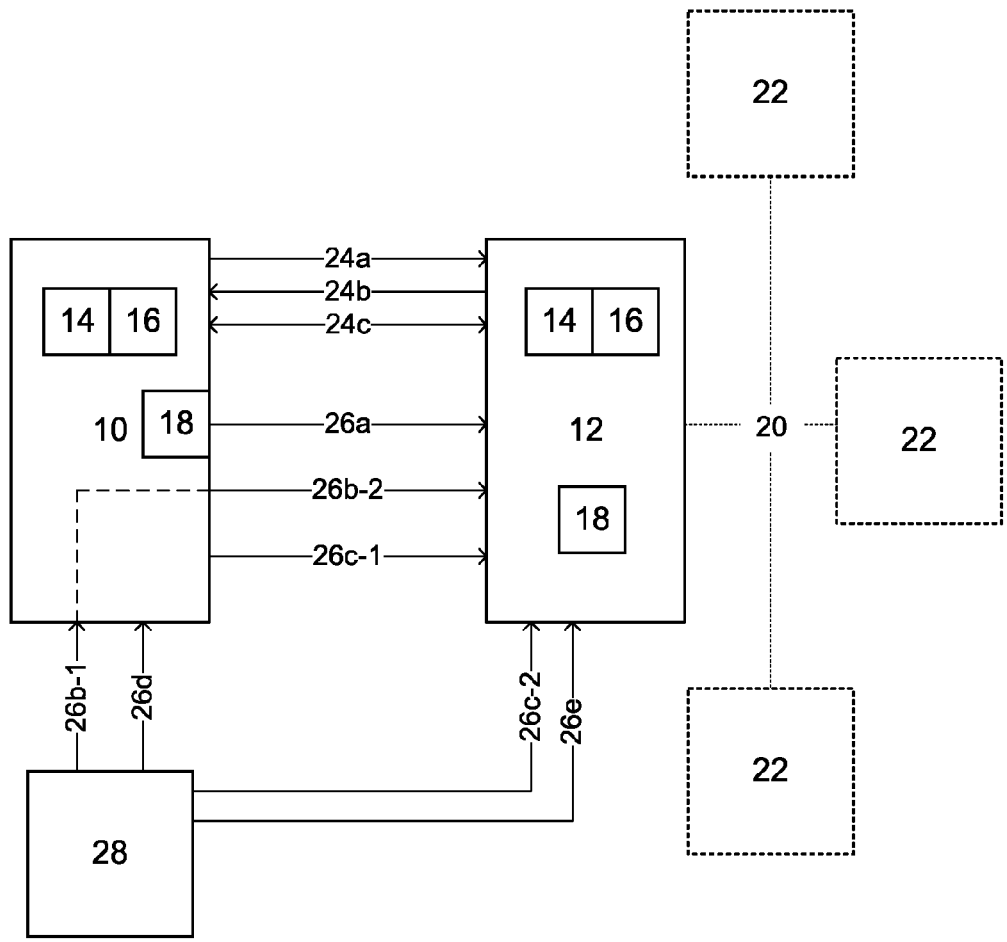
FIG. 1 illustrates a method and system according to one or more embodiments of the present invention.

FIG. 1 shows a first electronic device 10 and a second electronic device 12. Each device 10, 12 includes processing means 14 and at least one communication means 16 for carrying out various functions described in the following. Each device 10, 12 may also include a memory 18.

The second device 12 may form part of a network 20 also including several other similar electronic devices 22a-c, and the first device 10 can be a device newly added to the network 20. The devices 22a-c can be of any make, brand, or type. For example, one device 22a can be a laptop, another device 22b can be a TV, etc.

When the new device 10 is introduced into the network 20, a service discovery protocol allows the first device 10 to announce its presence and advertise its services and/or look for devices 12, 22 already on the network 20 (initial communication). For example, the first device 10 may announce its presence for the second device 12 by submitting a description or identification of itself and/or a description or identification of one or more desired services to the second device 12, as illustrated by reference sign 24a. Likewise, the first device 10 may receive from the second device 12 a description or identification of the second device 12 and/or a description or identification of any service(s) the second device 12 is/are running (24b). Also, mutual exchange of such data or credentials between the first and second devices 10, 12 may take place (24c). Numerous protocols for service discovery exist and can be used in conjunction with the present invention, including SSDP/UPnP, DNS-SD, UDDI and others.

Following the initial communication, the first device 10 may determine whether it is capable of further communicating with the second device 12 (receive data or commands from or send data or commands to), and whether the second device 12 can be updated with new instructions (e.g. software) in order to introduce or improve such capabilities. If this is the case, several alternatives are possible for actually providing the instructions that enable further communication between the devices 10, 12.

For example, the first device 10 may have the instructions pre-stored in its memory 18, wherein the first device 10 sends the instructions to the second device 12, as illustrated by reference sign 26a. Another alternative is that the first device 10 downloads the instructions from an external server or repository 28 (26b-1), for example via the Internet, and forwards the instructions to the second device 12 (26b-2). A third alternative is the first device 10 provides the second device 12 with a network address (26c-1) to the server or repository 28 or another similar external unit, from which the second device 12 can download the instructions (26c-2). Also, the first device 10 can determine that it needs additional instructions for further communication based on data from the second device 12, and download the instructions from the server or repository 28 or another similar unit on its own initiative (26d). Likewise, the second device 12 can determine that it needs additional instructions for further communication based on the received data from the first device 10, and download the instructions from the server or repository 28 or another similar unit on its own initiative (26e). Each device may be configured for performing one or more of the alternatives 26a-e.

Following any necessary software update, i.e. the instructions being un-packed (if necessary) and installed on the respective device, the first and second devices 10, 12 are now compatible and can further communicate using network protocols (for example TCP/IP, UDP, HTTP, HTTPS, SOAP) and properly formatted messages (for example XML, HTML). Hence, the devices 10, 12 are automatically configured and upgraded to interact using established standards.

While the above procedures have been described primarily in relation to the first device 10 communicating with the second device 12, the first device 10 may similarly communicate with the other devices 22. Also, the above procedures may be used to unite or facilitate interaction between just two devices (i.e. the other devices 22 may be omitted). Further, the initial communication and the provision of instructions may be repeated, for instance when a new device is connected to the network.

A device like the second device 12 should be able to provide data upon request in the further communication. For this it may have installed a user agent or Internet browser 30 that includes server functionality 32 (e.g. the ability to respond to HTTP requests) and the ability to run software that implement services, see FIG. 2. That latter can be implemented as web widgets, i.e. as small applications written in JavaScript and running on top of the JavaScript engine of the browser/server. A web browser/web server combination that can be used in conjunction with the present invention is described in the US patent application publication no. US 2010/0198938 A1 (MOLLAND el al.), the contents of which herein is incorporated by reference.

Figure 2:
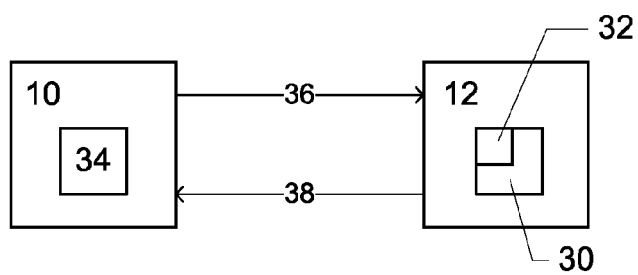
FIG. 2 further illustrates the method and system according to the invention.

Devices that do not implement services and that only need to be able to receive, process and present data can include a browser, a JavaScript functionality, and possibly a web widget engine. In FIG. 2, the first device 10 is illustrated comprising a web browser 34.

Physically, the devices 10, 12, 22 may or may not include a user interface for input and/or output, for example a screen, a keyboard, a touch screen, depending on whether the device is intended for direct manipulation by a user (e.g. a remote control) or only for remote access by another device (e.g. a wind speed gauge mounted on top of a roof).

Upon further communication shown in FIG. 2, the first device 10 may send a request 36 to the second device 12 using the browser 34. The request may for instance be a service request. The second device 12 may then respond to the (service) request using the installed software/instructions and the server component 32, as illustrated by reference sign 38. The response from the second device 12 may be read like a web page by the browser 34 in the first device 10.

In an exemplary, non-limiting application of the present invention, the first device 10 is a remote control or a device (e.g. a smart phone) running a remote control application, and the network 20 is a home entertainment system including a plurality of consumer electronic components 12, 22. The present method allows the remote control or remote control application to discover the components of the system, obtain necessary software to be able to communicate with them, and provide corresponding software to the entertainment system components. Such software could also include alternative menus and user interfaces for the components, for example an enhanced electronic program guide for a television or a set top box, or improved control software for the device itself.

In another exemplary, non-limiting application of the present invention, the first device 10 is for example a smart phone that wants to communicate with a refrigerator 12 over a LAN, WLAN, Internet or the like. Specifically, the smart phone wants to obtain information or data from the refrigerator, such as temperature and inventory status. Even though the refrigerator was not initially configured to communicate with the smart phone, the present method allows the smart phone and refrigerator to discover each other, exchange descriptions or capabilities, and download software to at least one of the smart phone and the refrigerator, so that smart phone subsequently can obtain the desired information from the refrigerator. In this application, the refrigerator may include server functionality as discussed above, so that it can provide data upon request from the smart phone.

Other applications of the present invention include, but are not limited to, communication with traffic control systems (e.g. traffic light or camera) or a power-box in the home. The invention may also be used in industrial applications, such as controlling robots in manufacturing.

The person skilled in the art will realize that the present invention by no means is limited to the embodiments described above. On the contrary, many modifications and variations are possible within the scope of the appended claims.

The invention claimed is:

1. A method of providing communication between a first device and a second device, wherein the first device has a web browser for communicating with the second device, and the second device has a web browser with a server component, the method comprising:

using, in the first device, a service discovery protocol to announce the presence of the first device to a network on which the second device is already present, and to look for devices already present in the network;

using the service discovery protocol to conduct an initial communication between the first device and the second device, wherein during the initial communication at least one of the first and second devices receives from the other of the first and second devices data including at least one of: a) a description or identification of the other of the first and second devices, and b) a description or identification of at least one service; and determining, based on the received data, a need for additional instructions to be provided to the second device to make the first and the second device compatible;

providing the additional instructions to the second device based at least on the received data, wherein the additional instructions and the server component allow the second device to respond to a subsequent request for a service from the first device;

wherein the requested service is provided by a web widget running on top of a script engine of the web browser of the second device.

2. The method of claim 1, further comprising:

sending, by the first device, the request for the service to the second device; and responding, by the second device, to the request using the instructions and the server component.

3. The method of claim 1, wherein the request and the response to the request are messages in a standardized format and sent using a standard network protocol.

4. The method of claim 1, wherein said additional instructions are provided based on b) the description or identification of a service.

5. The method of claim 1, wherein said instructions are at least one of software, configuration settings, a service providing software module, a computer-interpretable script, and a web or server widget.

6. The method of claim 1, wherein said instructions are automatically provided to the second device following the initial communication.

7. The method of claim 1, wherein the initial communication includes the first device receiving the data from the second device, and wherein providing the additional instructions to the second device includes at least one of:

the first device having the instructions pre-stored in a memory of the first device and sending the instructions to the second device;

the first device downloading the instructions from an external unit and forwarding the downloaded instructions to the second device; and the first device sending an address of an external unit to the second device, and the second device downloading the instructions from the external unit based on the address received from the first device.

8. The method of claim 1, wherein the initial communication includes the second device receiving the data from the first device, and wherein providing instructions to the second device includes the second device automatically downloading the instructions based on the data received from the first device.

9. A system, comprising:

at least one first electronic device having a web browser; and at least one second electronic device having a web browser with a web server component, wherein the first device is configured to send a service request to the second device using the web browser, and wherein the second device is configured to respond to the service request using the web server component and a service providing software module, the service providing software module is received by the second device from an external source and installed on the second device based on a mutual or one-sided exchange of credentials between the first and second device prior to the second device receiving the service request, the mutual or one-sided exchange is performed using a service discovery protocol by which the first device announces the first device's presence to a network on which the second device is already present.

* * * * *